United States Patent
Wilson et al.

[11] Patent Number: 5,720,688
[45] Date of Patent: *Feb. 24, 1998

[54] FULL-TIME TRANSFER CASE WITH SYNCHRONIZED DUAL PLANETARY GEAR REDUCTION UNIT

[75] Inventors: Robert J. Wilson, Warners; David Sperduti, Auburn, both of N.Y.

[73] Assignee: New Venture Gear, Inc., Troy, Mich.

[*] Notice: The term of this patent shall not extend beyond the expiration date of Pat. No. 5,651,749.

[21] Appl. No.: 783,498

[22] Filed: Jan. 14, 1997

Related U.S. Application Data

[63] Continuation of Ser. No. 596,873, Feb. 13, 1996.
[51] Int. Cl.[6] ............................................. F16H 48/06
[52] U.S. Cl. .................... 475/221; 475/198; 475/204; 475/339; 180/247
[58] Field of Search .......................... 475/198, 221, 475/220, 204, 205, 338, 339; 180/247, 248, 249; 74/665 F, 665 G

[56] References Cited

U.S. PATENT DOCUMENTS

| | | |
|---|---|---|
| 3,845,671 | 11/1974 | Sharp et al. . |
| 3,848,691 | 11/1974 | Dolan . |
| 4,031,780 | 6/1977 | Dolan et al. . |
| 4,103,753 | 8/1978 | Holdeman . |
| 4,347,762 | 9/1982 | Holdeman . |
| 4,440,042 | 4/1984 | Holdeman . |
| 4,552,241 | 11/1985 | Suzuki . |
| 4,569,252 | 2/1986 | Harper . |
| 4,677,873 | 7/1987 | Eastman et al. . |
| 4,718,303 | 1/1988 | Fogelberg . |
| 4,770,280 | 9/1988 | Frost . |
| 4,776,444 | 10/1988 | Worner et al. . |
| 4,804,061 | 2/1989 | Kameda ........................ 180/247 |
| 4,817,451 | 4/1989 | Weismann . |
| 4,821,591 | 4/1989 | Adler . |
| 4,848,508 | 7/1989 | Smirl et al. . |
| 4,860,612 | 8/1989 | Dick et al. . |
| 4,883,138 | 11/1989 | Kameda et al. . |
| 4,976,671 | 12/1990 | Andersson . |
| 5,046,998 | 9/1991 | Frost . |
| 5,054,335 | 10/1991 | Andrews . |
| 5,057,062 | 10/1991 | Yamasaki et al. . |
| 5,076,112 | 12/1991 | Williams . |
| 5,168,956 | 12/1992 | Namioka ........................ 180/248 |
| 5,226,503 | 7/1993 | Muller ........................ 180/248 X |
| 5,271,478 | 12/1993 | Kameda et al. ................ 180/247 |
| 5,275,252 | 1/1994 | Sperduti et al. . |
| 5,323,871 | 6/1994 | Wilson et al. . |

(List continued on next page.)

FOREIGN PATENT DOCUMENTS

| | | | |
|---|---|---|---|
| 0422422 | 6/1948 | Italy .............................. 475/339 |
| WO90/10806 | 9/1990 | WIPO . | |
| WO 94/20358 | 9/1994 | WIPO ............................ 475/338 |

OTHER PUBLICATIONS

"Automotive Handbook", Published By: Robert Bosch GmbH, 1986, Postfach 50, D-7000 Stuttgart 1, Automotive Equipment Product Group, Dept For Technical Information, p. 1 and Figure Showing 16-Speed Multi-Box Transmission.

Primary Examiner—Khoi Q. Ta
Assistant Examiner—Peter T. Kwon
Attorney, Agent, or Firm—Harness, Dickey & Pierce, P.L.C.

[57] ABSTRACT

A power transfer system is disclosed for a four-wheel drive vehicle operable for permitting a vehicle operator to select between various full-time and part-time four-wheel drive modes. The power transfer system includes a transfer case equipped with a dual-planetary gear reduction unit and a synchronized range shift mechanism operable for permitting the vehicle operator to shift on-the-fly for establishing full-time and part-time high-range and low-range four-wheel drive modes. The transfer case is also equipped with an electronically-controlled slip limiting/torque-biasing arrangement including an interaxle differential and a transfer clutch operable for controlling the magnitude of speed differentiation and torque biasing across the interaxle differential.

15 Claims, 7 Drawing Sheets

U.S. PATENT DOCUMENTS

| | | |
|---|---|---|
| 5,330,030 | 7/1994 | Eastman et al. . |
| 5,334,116 | 8/1994 | Baxter, Jr. . |
| 5,335,747 | 8/1994 | Muller ................................ 180/248 X |
| 5,346,442 | 9/1994 | Eastman . |
| 5,363,938 | 11/1994 | Wilson et al. . |
| 5,411,110 | 5/1995 | Wilson et al. . |
| 5,443,426 | 8/1995 | Frost ................................ 180/248 X |
| 5,450,919 | 9/1995 | Shitani . |
| 5,520,590 | 5/1996 | Showalter et al. . |
| 5,584,776 | 12/1996 | Weilant et al. ...................... 475/207 X |
| 5,609,540 | 3/1997 | Brissenden et al. ................. 180/248 X |
| 5,613,587 | 3/1997 | Baxter, Jr. .......................... 74/665 F X |

FULL-TIME TRANSFER CASE WITH SYNCHRONIZED DUAL PLANETARY GEAR REDUCTION UNIT

This application is a continuation of Ser. No. 08/596,873 filed on Feb. 13, 1996.

BACKGROUND OF THE INVENTION

The present invention relates to a power transfer system for controlling the distribution of drive torque between the front and rear wheels of a four-wheel drive vehicle as a function of various system and operator-initiated inputs.

Due to increased consumer demand for four-wheel drive vehicles, a plethora of different power transfer systems are currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a "mode" shift mechanism can be selectively actuated by the vehicle operator for directly coupling the non-driven wheels to the driven wheels for establishing a part-time four-wheel drive mode. As will be appreciated, motor vehicles equipped with such a part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770,280 to Frost.

Alternatively, it is known to use "on-demand" power transfer systems for automatically directing power to the non-driven wheels, without any input or action on the part of the vehicle operator, when traction is lost at the driven wheels. Modernly, the "on-demand" feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al wherein the electronically-controlled clutch assembly is operable for automatically controlling the amount of drive torque transferred to the non-driven wheels as a function of the wheel speed difference (i.e., the wheel slip) between the driven and non-driven wheels.

As a further alternative, some vehicles are equipped with full-time power transfer system having a transfer case equipped with a center differential that functions to permit interaxle speed differentiation while transferring drive torque to both of the front and rear drivelines. To minimize loss of traction due to wheel slippage, full-time transfer cases are typically equipped with a slip limiting device for locking the center differential to prevent speed differentiation and, in effect, establishing a part-time four-wheel drive mode. Examples of manually-actuated differential lock-up arrangements are disclosed in commonly-owned U.S. Pat. No. 3,848,691 to Dolan and U.S. Pat. No. 4,677,873 to Eastman. An automatic differential lock-up arrangement is disclosed in commonly-owned U.S. Pat. No. 3,845,671 to Sharp et al. wherein an electrically-controlled clutch assembly is actuated to lock-up the center differential when speed differentiation due to a wheel slip condition is detected as exceeding a predetermined value. In addition, torque-biasing differential lock-up arrangements are disclosed in commonly-owned U.S. Pat. No. 4,031,780 to Dolan et al. and U.S. Pat. No. 5,046,998 to Frost, which both utilize a viscous coupling to progressively modify the torque distribution in proportion to the magnitude of the speed differentiation across the center differential. Finally, electronically-controlled full-time transfer cases are disclosed in U.S. Pat. No. 4,718,303 to Fogelberg and U.S. Pat. No. 4,860,612 to Dick et al. wherein an electromagnetic biasing clutch is provided across the center differential to controllably bias the torque delivered to the front and rear drivelines in response to wheel slip.

To accommodate differing road surfaces and conditions, many of the above-referenced transfer cases are equipped with a gear reduction unit for providing high-range (i.e., direct drive) and low-range (i.e., reduced ratio drive) speed ratios in conjunction with the various four-wheel drive modes. Most commonly, the gear reduction units used in such dual-speed transfer cases include either a layshaft arrangement or a planetary gear assembly. However, in most current four-wheel drive vehicles, the transfer case can only be shifted between the four-wheel low-range drive mode and the four-wheel high-range drive mode when the motor vehicle is in a substantially non-motive condition. Unfortunately, the need to stop the vehicle prior to shifting between the available four-wheel drive speed ranges is inconvenient, particularly upon encountering road conditions or surface terrain where continuation of the vehicle's rolling momentum would assist in overcoming the conditions encountered. As such, gear reduction units have been designed which permit the vehicle operator to shift "on-the-fly" from the four-wheel low-range drive mode into the four-wheel high-range drive mode without stopping the vehicle. For example, U.S. Pat. No. 5,054,335 to Andrews discloses a transfer case having a synchronized shift arrangement for a layshaft-type gear reduction unit while commonly-owned U.S. Pat. No. 5,346,442 to Eastman discloses a transfer case having a synchronized shift arrangement for a planetary-type gear reduction unit. However, while both designs advance the art, the need still exists to develop a gear reduction unit that can also be shifted "on-the-fly" from the four-wheel high-range drive mode into the four-wheel low-range drive mode. In view of the fact that most modern dual-speed transfer cases are equipped with planetary-type gear reduction units, a particular need exists to develop a synchronized shift arrangement for such transfer cases to permit the vehicle operator to shift "on-the-fly" between both available four-wheel drive speed ranges.

SUMMARY OF THE INVENTION

It is therefore an object of the present invention to provide an improved power transfer system for use in four-wheel drive vehicles having a transfer case equipped with a clutch assembly for controlling the torque delivered to the front and rear wheels in response to changing vehicle conditions.

According to a preferred embodiment, the power transfer system of the present invention is operable for establishing a full-time four-wheel drive mode and includes a transfer case having a clutch assembly arranged to control speed differentiation and torque biasing across an interaxle differential, sensors for detecting and generating input signals indicative of various dynamic and operational characteristics of the vehicle, and a controller for controlling actuation of the clutch assembly in response to the sensor input signals. Under normal road and tractive conditions, the clutch assembly is maintained in a non-actuated condition. However, upon the occurrence of traction loss, the clutch assembly is automatically actuated for limiting interaxle slip while transferring increased drive torque to the non-slipping wheels. Under a preferred control scheme, the actuated condition of the clutch assembly is controllably varied between its non-actuated and fully-actuated limits as a function of the sensor input signals for automatically varying the speed differentiation and torque biasing across the interaxle differential in response to changes in the dynamic and operational characteristics of the vehicle.

The power transfer system may further include means for establishing a part-time four-wheel drive mode in addition to the full-time four-wheel drive mode. To this end, a mode select mechanism is provided for permitting the vehicle operator to select one of the full-time and part-time four-wheel drive modes and generate a mode signal indicative thereof. The mode signal is delivered to the controller for use in controlling actuation of the clutch assembly. When the part-time four-wheel drive mode is selected, the clutch assembly is fully-actuated for preventing speed differentiation across the interaxle differential and thereby delivering non-differentiated drive torque to the front and rear drivelines. When the full-time four-wheel drive mode is selected, the actuated condition of the clutch assembly is controllably varied between its non-actuated and fully-actuated limits in response to the sensor input signals for automatically varying speed differentiation and torque biasing across the interaxle differential. Thus, the power transfer system of the present invention offers the vehicle operator the option of selecting the specific four-wheel drive mode best-suited for operating the motor vehicle during normal or adverse road conditions as well as for off-road use.

As a further feature of the present invention, the transfer case is equipped with a dual-planetary gear reduction unit and a synchronized range shift mechanism that permit "on-the-fly" shifting between the four-wheel high-range and low-range drive modes. Accordingly, the synchronized range shift mechanism permits the vehicle operator to shift the transfer case between the various full-time and part-time four-wheel high-range and low-range drive modes without stopping the vehicle.

A further object of the present invention is to supply one or more "operator-initiated" input signals to the controller for further controlling automatic operation of the power transfer system in response thereto. Preferably, the operator-initiated input signals are indicative of the position of a movable control element (i.e., accelerator pedal, throttle position, steering wheel, brake pedal, etc.) and are used, in conjunction with the sensor input signals, for optimizing the torque biasing across the interaxle differential.

BRIEF DESCRIPTION OF THE DRAWINGS

Further objects, features and advantages of the present invention will become apparent to those skilled in the art from analysis of the following written description, the accompanying drawings and the appended claims in which:

DETAILED DESCRIPTION OF THE INVENTION

Figure 1:
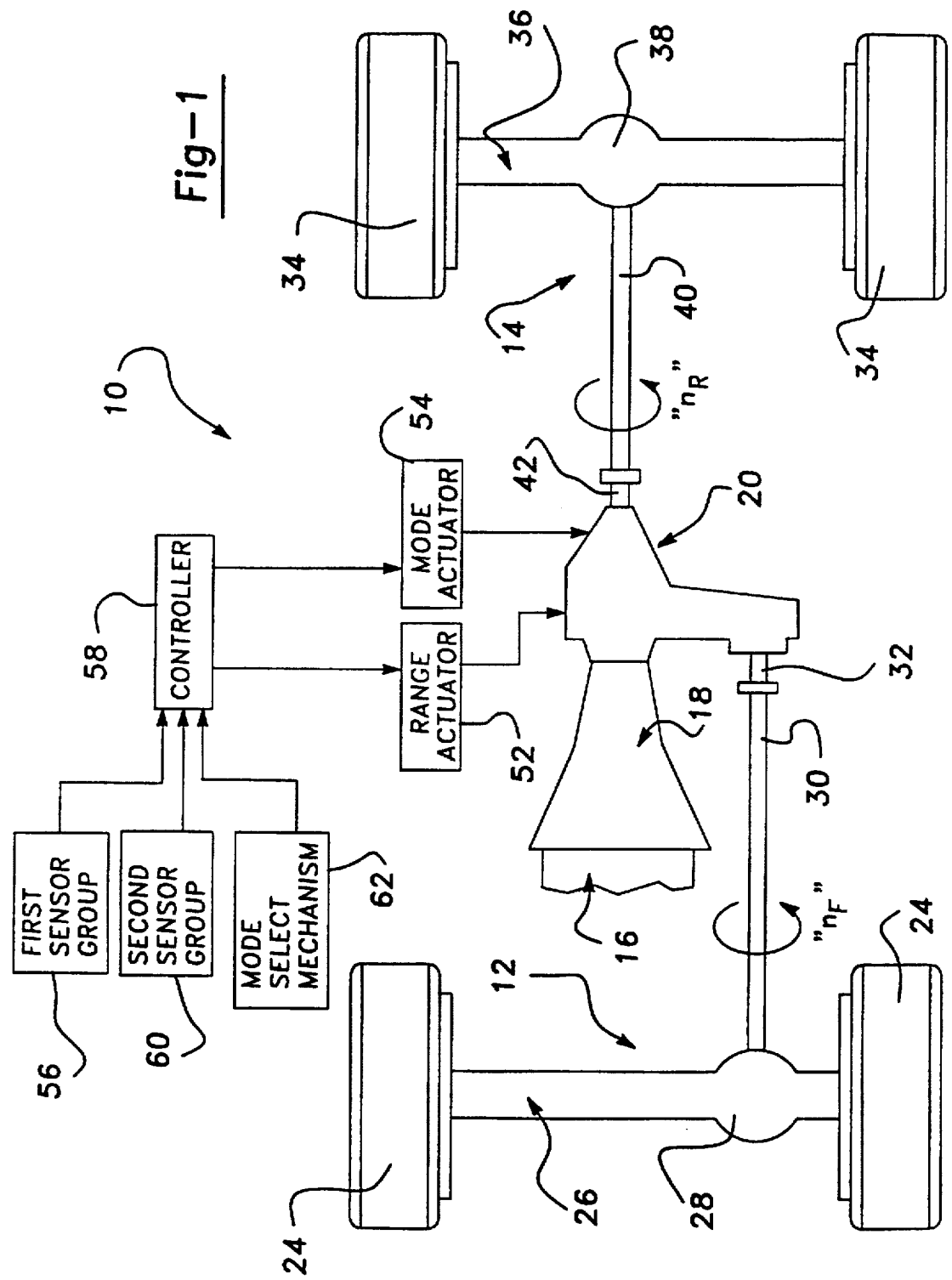
FIG. 1 is a schematic representation of a four-wheel drive motor vehicle equipped with the power transfer system of the present invention.

According to the presently preferred embodiment of the present invention, a power transfer system is disclosed for a four-wheel drive vehicle which includes means for permitting a vehicle operator to select between a full-time four-wheel drive mode and a part-time four-wheel drive mode. In addition, the power transfer system includes a dual-planetary gear reduction unit that is operable for providing high-range and low-range speed ratios. Moreover, the power transfer system of the present invention includes a synchronized range shift mechanism that is operable to permit the vehicle operator to shift "on-the-fly" between the various available full-time and part-time high-range and low-range four-wheel drive modes.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain is an all-wheel drive system which incorporates a transfer case 20 for transmitting drive torque from engine 16 and transmission 18 to front driveline 12 and rear driveline 14. Front driveline 12 includes a pair of front wheels 24 connected at opposite ends of a front axle assembly 26 having a front differential 28 that is coupled to one end of a front drive shaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear drive shaft 40, the opposite end of which is interconnected to a rear output shaft 42 of transfer case 20. As will be detailed hereinafter with greater specificity, transfer case 20 is equipped with a synchronized range shift mechanism 44 for use with a dual-planetary gear reduction unit 46 for "on-the-fly" shifting between four-wheel high-range and low-range drive modes. Transfer case 20 is also equipped with an electronically-controlled "slip limiting/torque-biasing" arrangement 48 including an inter-axle (i.e., center) differential 22 operably interconnecting front output shaft 32 and rear output shaft 42, and a transfer clutch 50 that is operable to control the magnitude of speed differentiation and modify the torque distribution ratio across center differential 22.

Power transfer system 10 further includes a first or "range" actuator 52 for actuating synchronized range shift mechanism 46, a second or "mode" actuator 54 for actuating transfer clutch 50, a first sensor group 56 for sensing specific dynamic and operational characteristics of the motor vehicle and generating sensor input signals indicative thereof, and a controller 58 for generating control signals in response to the sensor input signals. Moreover, controller 58 is adapted to control the actuated condition of range shift mechanism 46 and transfer clutch 50 by sending the control signals to range and mode actuators 52 and 54. Power transfer system 10 can optionally include a second sensor group 60 for generating one of more "operator-initiated" input signals that are indicative of the position of movable control elements under the control of the vehicle operator. The operator-initiated input signals are used for establishing control characteristics which, in combination with the sensor input signals, are used to generate control signals to further regulate the torque distribution across transfer clutch 50.

Power transfer system 10 also includes a mode select mechanism 62 for permitting the vehicle operator to select one of the available full-time or part-time four-wheel high-range and low-range drive modes. In particular, controller 58 controls range actuator 52 and mode actuator 54 in response to a mode signal sent to controller 58 from mode select mechanism 62 that is indicative of the particular mode selected. As will be detailed, when one of the full-time four-wheel drive modes is selected, controller 58 operates to continuously monitor and automatically regulate the actuated condition of transfer clutch 50 between its non-actuated and fully-actuated limits for varying the magnitude of speed differentiation and drive torque transmitted across center differential 22. Preferably, controller 58 functions to control actuation of transfer clutch 50 so as to increase the drive torque delivered to the slower turning output shaft while concurrently decreasing the drive torque delivered to the faster turning output shaft in an amount equal to the torque capacity of transfer clutch 50 at a given actuated state. However, when the mode signal indicates that one of the part-time four-wheel drive modes has been selected, transfer clutch 50 is fully actuated to maintain center differential 22 in a "locked-up" condition, whereby non-differentiated power is delivered to output shafts 32 and 42. The part-time four-wheel drive modes are provided for permitting improved traction when the motor vehicle is operated off-road or on severe road conditions.

With particular reference now to FIGS. 2 through 6, a preferred construction for transfer case 20 will now be described. Transfer case 20 is shown to include a housing 64 formed by a series of modular sections which are suitably interconnected by a plurality of threaded fasteners 66. An input shaft 68 is shown rotatably supported in housing 64 via a bearing assembly 70. A transmission output shaft, partially shown at 72, is coupled (i.e., splined) to input shaft 68 such that both are rotatably driven by engine 16 of the motor vehicle. Dual-planetary gear reduction unit 46 is installed between input shaft 68 and a mainshaft 74 and is operable, in conjunction with range shift mechanism 44, for selectively establishing a direct speed ratio (i.e., high-range) and a reduced speed ratio (i.e., low-range) drive connection therebetween. Thus, a "high-range" drive mode is established when mainshaft 74 is driven at the direct speed ratio (i.e., 1:1) relative to input shaft 68 and a "low-range" drive mode is established when mainshaft 74 is driven at the reduced speed ratio (i.e., 0.50:1) relative to input shaft 68. Finally, dual-planetary gear reduction unit 46 is operable for establishing a "Neutral" non-driven mode for interrupting the transfer of drive torque from input shaft 68 to mainshaft 74.

Figure 3:
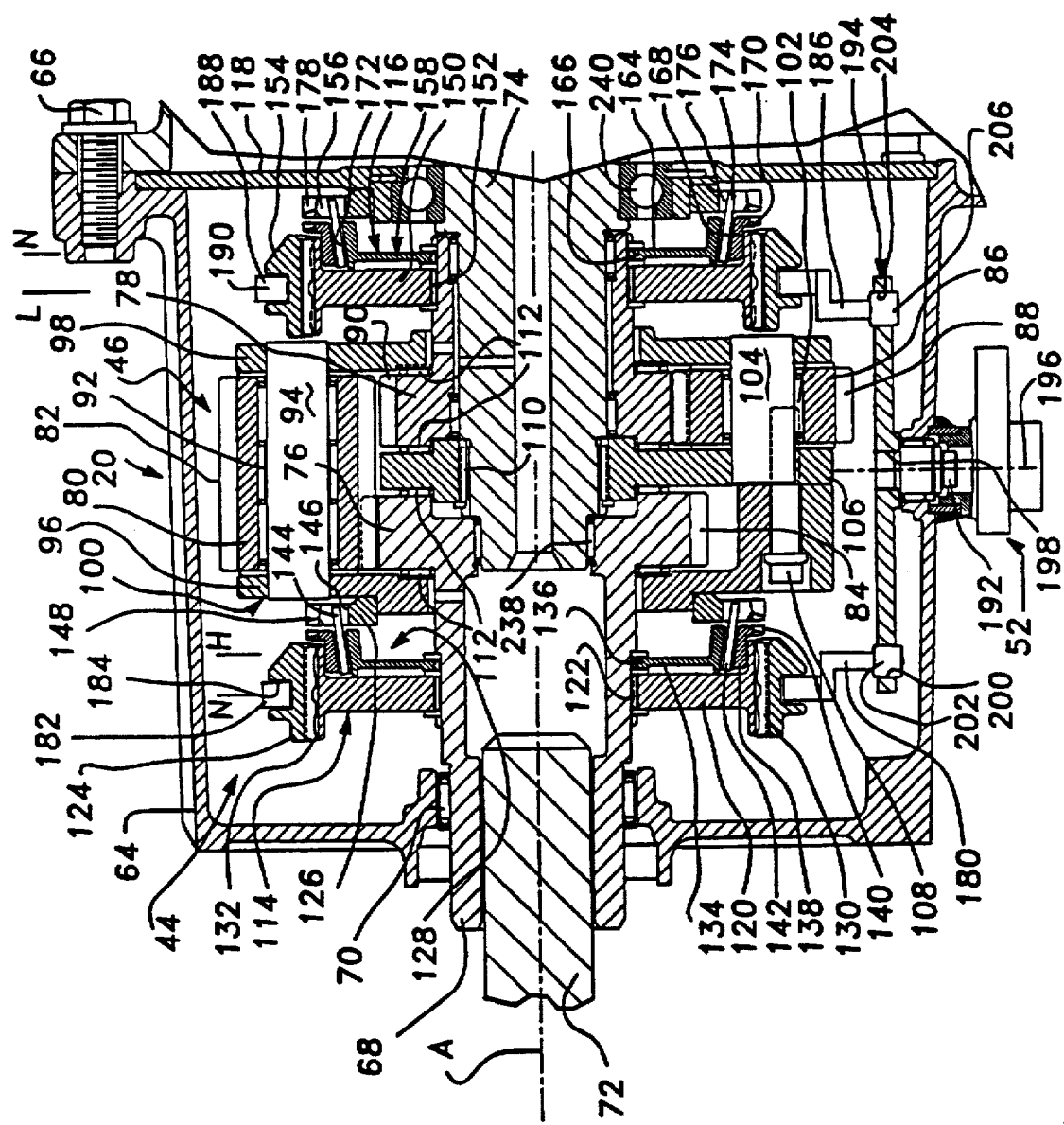
FIG. 3 is an enlarged partial cross-sectional view showing the dual-planetary gear reduction unit and synchronized range shift arrangement in greater detail.

As best seen from FIG. 3, dual-planetary gear reduction unit 46 includes a first sun gear 76 integrally formed on input shaft 68, a second sun gear 78 rotatably supported on mainshaft 74, a set of full-length or first planet gears 80 each having teeth 82 meshed with teeth 84 of first sun gear 76, and a set of half-length or second planet gears 86 each having teeth 88 meshed with teeth 82 of one of first planet gears 80 and teeth 90 of second sun gear 78. Each full-length planet gear 80 is rotatably supported via bearings 92 on a pinion shaft 94, the opposite ends of which are mounted in front and rear carrier rings 96 and 98, respectively, of a carrier assembly 100. Similarly, each half-length planet gear 86 is rotatably supported via bearings 102 on a pinion shaft 104, the opposite ends of which are mounted in central and rear carrier rings 106 and 98, respectively, of carrier assembly 100. Preferably, carrier rings 96, 106, and 98 are secured together by suitable fasteners, such as bolts 108. Central carrier ring 106 is shown to be coupled via a splined connection 110 to mainshaft 74. To facilitate relative rotation between the various components of dual-planetary gear reduction unit 46, suitable thrust bearings 112 are shown positioned between the carrier rings and the sun gears.

According to the presently preferred embodiment, first sun gear 76 has its gear teeth 84 located at a first radial distance from the principal axis, denoted by axis line "A", of mainshaft 74 while gear teeth 90 of second sun gear 78 are located at a second lesser radial distance relative to the principal axis. Each full-length planet gear 80 extends longitudinally substantially the full axial extent between front and rear carrier rings 96 and 98. Similarly, each half-length planet gear 86 extends longitudinally substantially the full axial extent between center and rear carrier rings 106 and 98. To provide the desired reduced speed ratio across dual-planetary gear reduction unit 46, first sun gear 76 has forty-three teeth, second sun gear 78 has thirty-eight teeth, full-length planet gears 80 have eighteen teeth, and half-length planet gears 86 have twenty-one teeth.

To provide means for selectively establishing the high-range and low-range drive connections between input shaft 68 and mainshaft 74, synchronized range shift mechanism 44 is provided in conjunction with dual-planetary gear reduction unit 46. As will be detailed, synchronized range shift mechanism 44 is operable for permitting transfer case 20 to be shifted "on-the-fly" between the four-wheel high-range and low-range drive modes. As best seen from FIG. 3, synchronized range shift mechanism 44 includes a first synchronizer clutch apparatus 114 and a second synchronizer clutch apparatus 116. In general, first synchronizer clutch apparatus 114 is operable for establishing the high-range drive connection between input shaft 68 and mainshaft 74 by directly coupling carrier assembly 100 of dual-planetary gear reduction unit 46 to input shaft 68. Since central carrier ring 106 is fixedly splined to mainshaft 74, direct coupling of carrier assembly 100 to input shaft 68 results in mainshaft 74 likewise being driven without reduction by input shaft 68. In contrast, second synchronizer clutch apparatus 116 is operable for establishing the low-range drive connection between input shaft 68 and mainshaft 74 by coupling second sun gear 78 to a central web plate 118 of housing 64. Such a coupling results in the braking of second sun gear 78 which, in turn, causes carrier assembly 100 to be rotatably driven at the desired reduced speed ratio relative to input shaft 68.

First synchronizer clutch apparatus 114 is shown to include a hub 120 that is fixed via a splined connection 122 to input shaft 68, a first range sleeve 124 supported for rotation with and axial sliding movement on hub 120, a first clutch plate 126 fixed (i.e., welded, etc.) to front carrier ring 96, and a cone-type synchronizer assembly 128. As best seen in FIG. 3, hub 120 has external longitudinal splines 130 formed on its outer peripheral rim and first range sleeve 124 has internal longitudinal splines 132 meshed therewith. First range sleeve 124 is shown positioned in its neutral position, denoted by position line "N". Cone-type synchronizer assembly 128 is a dual-cone arrangement having an inner ring 134 fixed via a splined connection 136 to input shaft 68, an outer blocker ring 138 having blocker teeth 140, and a reaction ring 142 having drive tangs 144 projecting into apertures 146 formed in clutch plate 126. As is otherwise conventional, the cone torque developed between the facing conical surfaces of inner ring 134, blocker ring 138 and reaction ring 142 inhibits splines 132 of first range sleeve 124 from passing through blocker teeth 140 and into meshed engagement with clutch teeth 148 on clutch plate 126 until speed synchronization between carrier assembly 100 and input shaft 68 is complete. Once speed synchronization is complete, first range sleeve 124 is free to move to its high-range position, denoted by position line "H", whereat its splines 132 are coupled to clutch teeth 148 on clutch plate 126 for establishing the high-range drive connection between input shaft 68 and mainshaft 74.

With continued reference to FIG. 3, the components of second synchronizer apparatus 116 are shown to be substantially similar to those of first synchronizer apparatus 114 and include a hub 150 fixed via a splined connection 152 to second sun gear 78, a second range sleeve 154 supported for rotation with and axial sliding movement on hub 150, a second clutch plate 156 fixed to web plate 118 of housing 64, and a dual-cone synchronizer assembly 158. Second range sleeve 154 has internal longitudinal splines 160 that are meshed with external longitudinal splines 162 formed on the outer peripheral rim of hub 150 and is shown in its neutral position, denoted by position line "N". Dual-cone synchronizer assembly 158 includes an inner ring 164 fixed via splined connection 166 to second sun gear 78, a blocker ring 168 having blocking teeth 170, and a reaction ring 172 having tangs 174 projecting into apertures 176 formed in second clutch plate 156. In operation, dual-cone synchronizer assembly 158 inhibits splines 160 of second range sleeve 154 from passing through blocking teeth 170 of blocker ring 168 and into coupled engagement with clutch teeth 178 on second clutch plate 156 until speed synchronization between housing web plate 118 and second sun gear 78 is complete. Obviously, such speed synchronization results in second sun gear 78 being braked and held stationary due to its direct coupling to housing 64. Upon completion of speed synchronization, second range sleeve 154 is permitted to move to its low-range position, denoted by position line "L", whereat its splines 160 are coupled to clutch teeth 178 of second clutch plate 156 for establishing the low-range drive connection between input shaft 68 and mainshaft 74.

In addition to establishing the high-range and low-range drive modes, dual-planetary gear reduction unit 46 is also operable to establish a Neutral non-driven mode in which mainshaft 74 is not rotatably driven by input shaft 68. Thus, when it is desired to shift transfer case 20 into its Neutral mode, first and second range sleeves 124 and 154 are both moved to their respective neutral positions, whereat first range sleeve 124 is uncoupled from first clutch plate 126 and second range sleeve 154 is uncoupled from second clutch plate 156. As such, rotation of input shaft 68 and first sun gear 76 causes first and second planet gears 80 and 86 to rotate about their respective pinion shafts 94 and 104 which, in turn, causes second sun gear 78 to be rotatably driven. As a result, carrier assembly 100 is not rotatably driven in response to rotation of first sun gear 76, whereby mainshaft 74 is also maintained in a non-driven state.

Synchronized range shift mechanism 44 further includes a first range fork 180 having projections 182 that are retained in a groove 184 formed in first range sleeve 124, and a second range fork 186 having projections 188 retained in a groove 190 formed in second range sleeve 154. Transfer case 20 further includes means for causing coordinated axial movement of range forks 180 and 186 for establishing the three above-noted drive modes in response to actuation of range actuator 52. Preferably, range actuator 52 is an electrically-actuated rotary device, such as an electric gearmotor and encoder assembly, which is operable for generating an output torque, the value of which varies as a function of the magnitude of the electrical control signal applied thereto by controller 58. To provide means for controlling coordinated movement of range sleeves 124 and 154, a rotary output member 192 of range actuator 52 is secured to a first or "range" sector 194, that functions to change the output torque of range actuator 52 into an axially-directed force. As best seen from FIGS. 3 and 4, output member 192 is supported from transfer case housing 64 for rotation about an axis 196, and is secured in an aperture 198 formed in range sector 194. To generate the desire bi-directional axial movement of first range sleeve 124, range sector 194 includes a first guide slot 200 in which a first roller pin 202 is retained. First roller pin 202 is secured to first range fork 180. The contour of first guide slot 200 is configured to control the amount and direction of axial movement of first roller pin 202, first range fork 180 and first range sleeve 124 in response to the magnitude and direction of rotation of range sector 194. To generate the desired bi-directional axial movement of second range sleeve 154, range sector 194 includes a second guide slot 204 within which a second roller pin 206 is retained. Second roller pin 206 is operably secured to second range fork 186. Thus, the contour of second guide slot 204 is configured to control the desired amount and direction of axial movement of second roller pin 206, second range fork 186 and second range sleeve 154 in response to the magnitude and direction of rotation of range sector 194.

Figure 4:
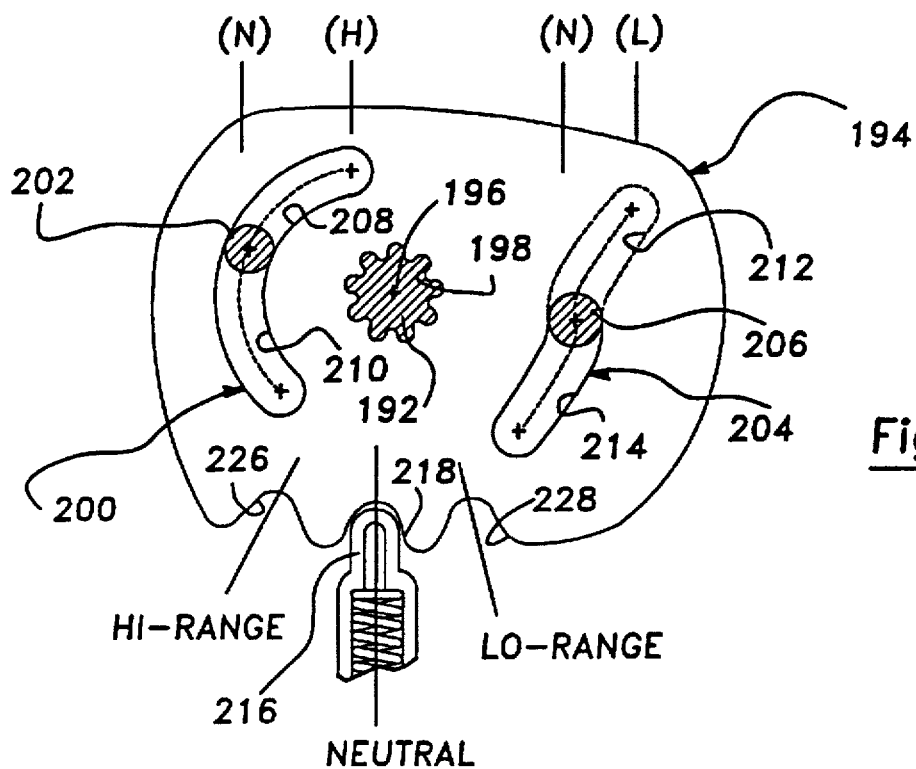
FIG. 4 is a side view of the sector plate used for controlling coordinated movement of the synchronized range shift arrangement.
Figure 6:
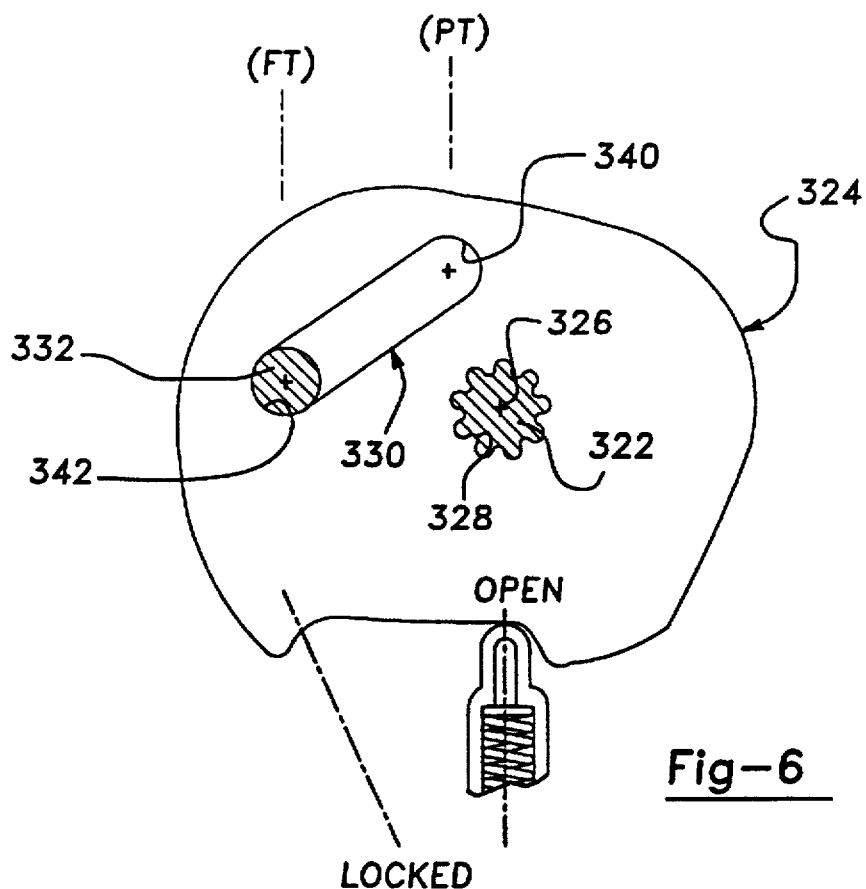
FIG. 6 is a side view of the sector plate used for controlling actuation of the clutch assembly.

With particular reference now to FIG. 4, it can be seen that range sector 194 may be rotated by output member 192 to any one of three distinct sector positions, as labelled "Hi-Range", "Neutral", and "Lo-Range". The particular speed range established between input shaft 68 and mainshaft 74 across dual-planetary gear reduction unit 46 is controlled by the position of first and second roller pins 202 and 206 within first and second guide slots 200 and 204, respectively, which, as noted, also establishes the axial location of first and second range sleeves 124 and 154. In operation, the vehicle operator selects a desired operative drive mode via actuation of mode select mechanism 62, which, in turn, signals controller 58 of the selection. Thereafter, controller 58 generates an electrical control signal that is applied to range actuator 52 for controlling the rotated position of output member 192 and range sector 194. Range sector 194 is shown positioned in its Neutral sector whereat first roller pin 202 is centrally located in first guide slot 200 at the intersection of its first and second slot segments 208 and 210 to define its neutral (N) position and locate first range sleeve 124 in its neutral position. Similarly, second roller pin 206 is centrally located in second guide slot 204 at the intersection of its first and second slot segments 212 and 214 to define its neutral (N) position and locate second range sleeve 154 in its neutral position. A spring-biased poppet assembly 216 is shown located in a central detent 218 for positively locating range sector 194 in its Neutral sector position. When mode select mechanism 62 signals selection of a four-wheel high-range drive mode, controller 58 sends a control signal to range actuator 52 for causing range sector 194 to be rotated in a first (i.e., counterclockwise) direction until poppet assembly 216 is located in a high-range detent 220 for locating range sector 194 in its Hi-Range sector position. Such rotation of range sector 194 causes first roller pin 202 to travel in slot segment 208 of first guide slot 200, the contour of which causes first roller pin 202 to move axial from the (N) position shown to the (H) position which, in turn, causes first range sleeve 124 to move from its neutral position to its high-range position. Concurrently, second roller pin 206 is guided within slot segment 214 of second guide slot 204 which is configured for maintaining second roller pin 206 in its (N) position which, in turn, maintains second range sleeve 154 in its neutral position. Finally, when mode select mechanism 62 signals selection of a four-wheel low-range drive mode, controller 58 sends an electrical control signal to range actuator 52 for causing range sector 194 to be rotated in a second (i.e., clockwise) direction until poppet assembly 216 is located in a low-range detent 228 for locating range sector 194 in its Lo-Range sector position. Such rotation of range sector 194 results in first roller pin 202 being guided within slot segment 210 of first guide slot 200, the contour of which maintains first roller pin 202 in its (N) position which, in turn, maintains first range sleeve 124 in its neutral position. Concurrently, second roller pin 206 is guided within slot segment 212 of second guide slot 206, the contour of which causes second roller pin 206 to move axially from its (N) position to the (L) position which, in turn, cause moving second range sleeve 154 to move from its neutral position to its low-range position. Range sector 194 can be rotated directly from its Lo-Range sector position into its Hi-Range sector position as well as directly from its Hi-Range sector position into its Lo-Range sector position. Poppet assembly 216 preferably provides an electrical signal to controller 58 that is indicative of the rotated position of range sector 194.

Figure 2:
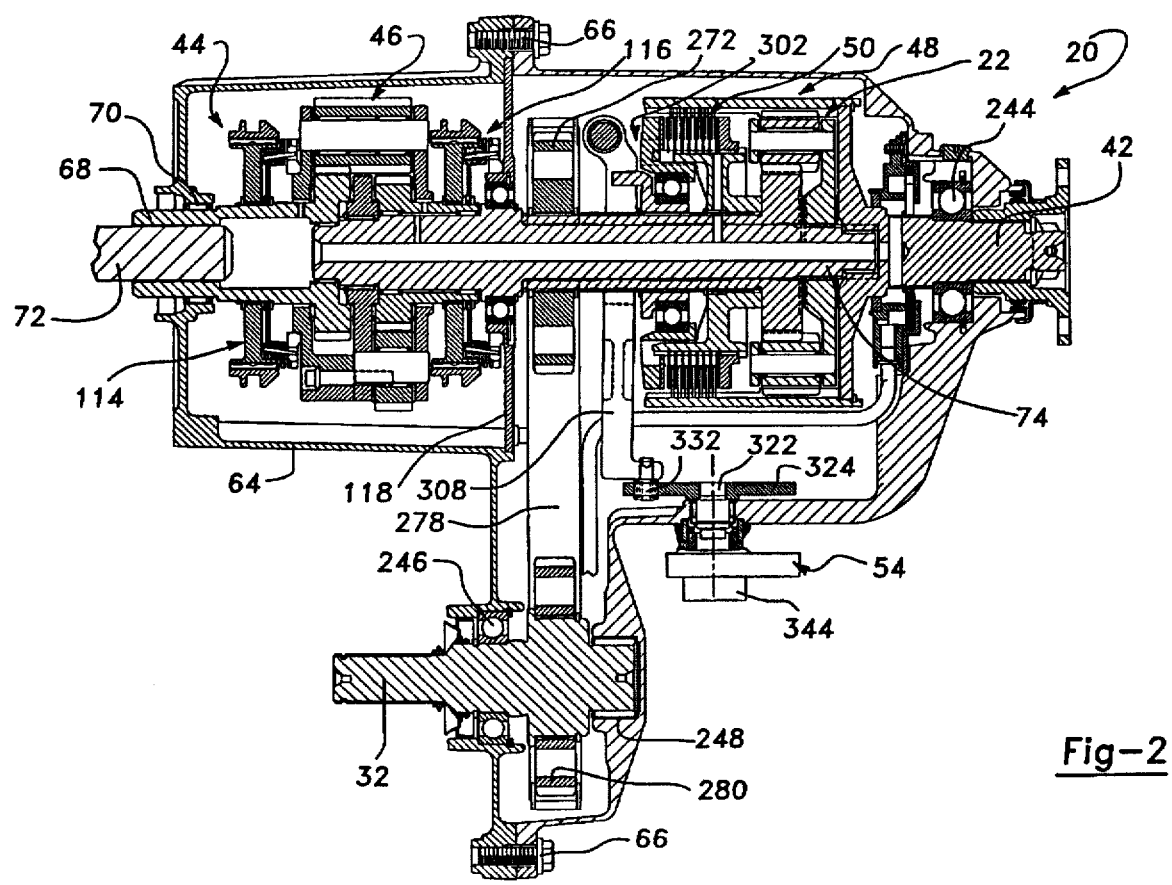
FIG. 2 is a cross-sectional view of a transfer case constructed according to a preferred embodiment of the present invention.
Figure 5:
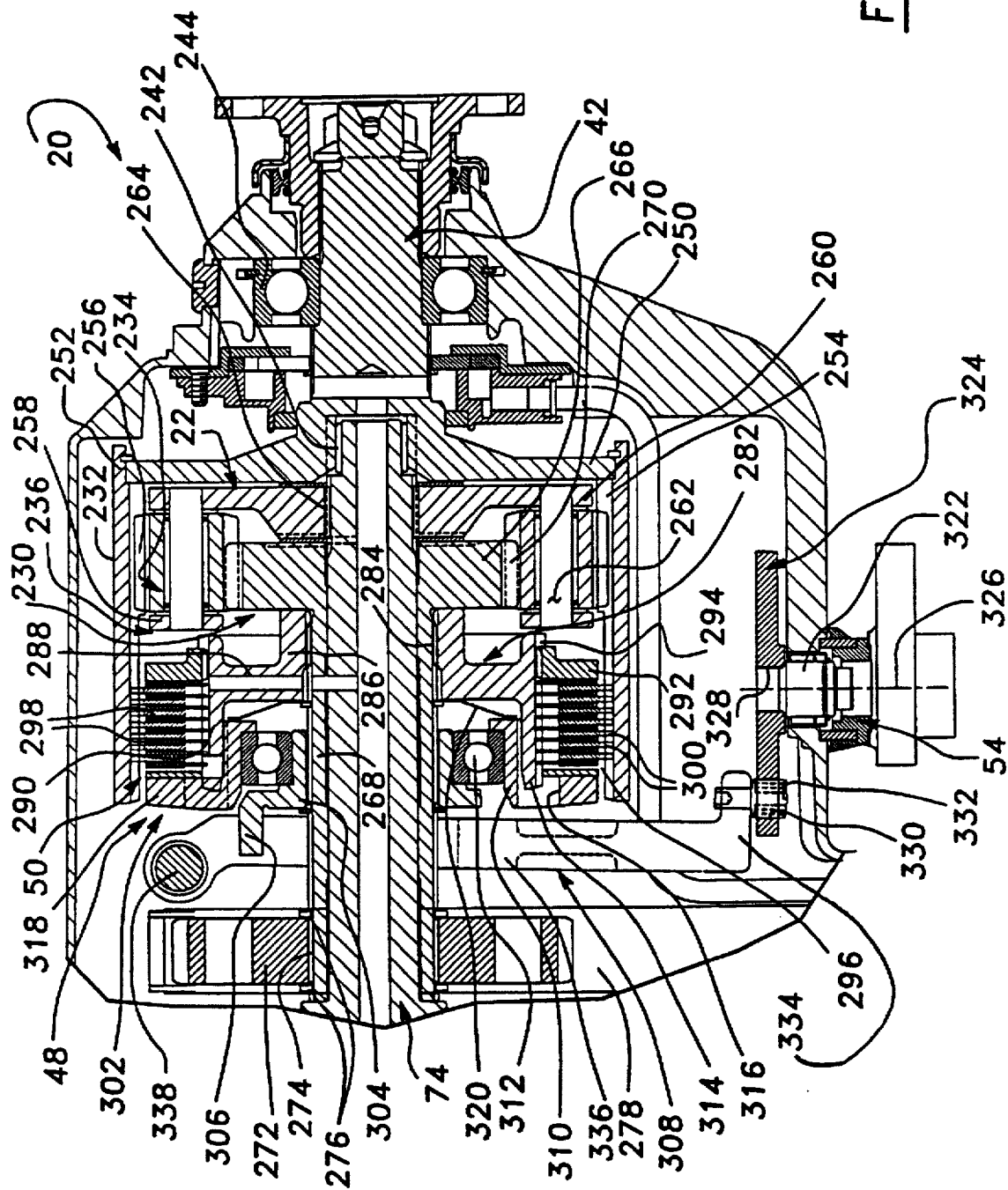
FIG. 5 is also an enlarged partial view of FIG. 2 showing various components of the interaxle differential and clutch assembly in greater detail.

With particular reference now to FIGS. 2 and 5, the various components associated with slip limiting/torque-biasing arrangement 48 in transfer case 20 will now be described. Specifically, center differential 22 is provided for mechanically coupling mainshaft 74 to front driveshaft 30 and rear driveshaft 40 in an arrangement permitting speed differentiation while distributing drive torque therebetween. While any suitable differential unit is contemplated for use with transfer case 20, center differential 22 is disclosed as a single planetary gearset having a sun gear 230 connected for rotation with front output shaft 32, a ring gear 232 coupled for rotation with rear output shaft 42, and a plurality of pinion gears 234 carried by a planet carrier 236 that is coupled for rotation with mainshaft 74. Moreover, each pinion gear 234 intermeshes with both sun gear 230 and ring gear 232. As seen, mainshaft 74 is coupled to the output of dual-planetary gear reduction unit 46 via its direct splined connection to center carrier ring 106. Thus, driven rotation of mainshaft 74 causes center differential 22 to drive front and rear output shafts 32 and 42, respectively, at a predetermined speed ratio with respect to one another. As is known, the torque distribution (i.e., the torque split) normally delivered across center differential 22 to output shafts 32 and 42 is a ratio determined by the particular gear geometry associated with the intermeshed gear components.

With continued reference to FIGS. 2 through 5, mainshaft 74 is shown to have its forward end rotatably supported by a bearing assembly 238 mounted in a piloted bore in input shaft 68, its intermediate portion rotatably supported by a bearing assembly 240 mounted in housing web plate 118, and its rearward end rotatably supported by a bearing assembly 242 mounted in a piloted bore in rear output shaft 42. Similarly, rear output shaft 42 is rotatably supported in housing 64 by a bearing assembly 244 and front output shaft 32 is rotatably supported in housing 64 via bearing assemblies 246 and 248. Rear output shaft 42 is shown to include a radially-extending plate segment 250 that is fixedly secured to one end of a cylindrical outer drum 252. Ring gear 232 is defined by a set of gear teeth 254 formed on the inner peripheral surface of outer drum 252. Gear teeth 254 are shown to be in constant mesh with gear teeth 256 of pinion gears 234. As is also shown, planet carrier 236 includes a pair of carrier rings 258 and 260 between which pinion gears 234 are journally supported for rotation on pins 262. Carrier ring 260 is fixed via a splined connection 264 to mainshaft 74. Sun gear 230 is journally supported on an intermediate portion of mainshaft 74 for relative rotation with respect thereto and is integrally formed to include a gear hub 266 and an elongated shaft sleeve 268. Gear hub 266 has external gear teeth 270 formed thereon which are in constant meshed engagement with gear teeth 256 of pinion gears 234. A drive sprocket 272 is shown fixed via a splined connection 274 to shaft sleeve 268 of sun gear 230 with a pair of retaining rings 276 provided for maintaining its axial alignment with respect thereto. Drive sprocket 272 drivingly engages a chain 278 coupled to a driven sprocket 280 which is coupled to, or an integral portion of, front output shaft 32. Thus, in the embodiment disclosed, planet carrier 236 is the input member of center differential 22 while sun gear 230 and ring gear 232 are its front and rear output members, respectively.

Transfer clutch 50 is installed within transfer case 20 for controlling speed differentiation and the resulting torque distribution between ring gear 232 and sun gear 230 of center differential 22. Transfer clutch 50 is a multi-plate friction clutch assembly and includes an inner drum 282 that is fixed via a splined connection 284 to shaft sleeve 268 for rotation with sun gear 230. In particular, inner drum 282 is formed to include an annular hub segment 286 splined to shaft sleeve 268, a web segment 288 extending radially from hub segment 286, and a cylindrical rim segment 290 formed at the opposite end of web segment 288 which extends coaxially to hub segment 286. A pressure plate 292 is splined for rotation with inner drum 282 and abuts a radial flange stop 294 formed thereon. Outer drum 252 is shown to surround inner drum 276 so as to form an internal chamber 296 therebetween. Disposed within internal chamber 296 are two sets of alternately interleaved friction clutch plates that can be frictionally compressed for limiting speed differentiation and biasing the torque distribution between sun gear 230 and ring gear 232 of center differential 22. In particular, a set of inner clutch plates 298 are mounted (i.e., splined) to rim segment 290 of inner drum 282 for rotation with sun gear 230. Likewise, a set of outer clutch plates 300 are mounted (i.e., splined) to outer drum 252 for rotation with ring gear 232. The interleaved clutch plates are supported for axial sliding movement to establish frictional contact between.

Transfer clutch 50 is shown to include a thrust mechanism 302 supported for axial sliding movement on shaft sleeve 268 and which is operable for frictionally compressing the interleaved clutch plates as a function of the clutch engagement force exerted thereon. Thrust mechanism 302 includes an annular inner bearing support 304 journally supported for sliding non-rotatable movement on shaft sleeve 268. To this end, inner bearing support 304 includes one or more axial flanges 306 that are nested within a corresponding aperture formed in a pivotable lever arm 308 for inhibiting rotation of inner bearing support 304. Thrust mechanism 302 also includes an annular outer bearing support 310 that is coupled for rotation with inner drum 282 and a bearing assembly 312 retained between inner bearing support 304 and outer bearing support 310. As seen, axial lugs 314 formed on the distal end of rim segment 290 are nested within apertures 316 in outer bearing support 310. Thus, outer bearing support 310 is supported for rotation with inner drum 282 and ring gear 232 while inner bearing support 304 is held stationary relative thereto. Buttons (not shown), are mounted on lever arm 308 and are adapted to engage inner bearing support 304 for causing sliding movement of thrust mechanism 302 in response to pivotal movement of lever arm 308. Such axial sliding movement of thrust mechanism 302 causes a clutch engagement force to be exerted by an apply plate segment 318 of outer bearing support 310 on the interleaved clutch plates. An annular return spring 320 is retained between inner drum 282 and outer bearing support 310 for normally biasing thrust mechanism 302 in a direction away from the clutch plates.

Preferably, mode actuator 54 is also an electrically-actuated rotary actuator, such as an electric gearmotor and encoder assembly, which is operable for generating an output torque, the value of which varies as a function of the magnitude of the electrical control signal applied thereto by controller 58. To provide means for selectively controlling the magnitude of the clutch engagement force exerted on thrust mechanism 302, a rotary output member 322 of mode actuator 54 is connected to a second or "mode" sector 324, for changing its output torque into an axially-directed force used for controlling the clutch engagement force applied by lever arm 308 on thrust mechanism 302 of transfer clutch 50. Output member 322 is supported from transfer case housing 64 for rotation about an axis 326 and is secured in an aperture 328 formed in mode sector 324.

To generate the desired clutch engagement force, mode sector 324 includes a mode slot 330 within which a crowned roller 332 is retained. Crowned roller 332 is fixed to a flange section 334 of lever arm 308. Lever arm 308 also includes a generally Y-shaped or forked section 336 which is bifurcated to surround mainshaft 74. The bifurcated ends of forked section 336 are retained for pivotal movement on a transverse rail 338, the ends of which are retained in suitable sockets (not shown) formed in housing 64. The contour of mode slot 330 is configured to cause the desired direction and amount of pivotal movement of lever arm 308 in response to the direction and magnitude of rotation of mode sector 324 for generating the desired clutch engagement force to be exerted on thrust mechanism 302 of transfer clutch 50.

Mode sector 324 may be rotated about axis 326 through a predefined range of angular motion defined between two distinct sector positions, labelled as "LOCKED" and "OPEN". With mode sector 324 in its LOCKED sector position, crowned roller 332 is positioned within mode slot 330 in close proximity to terminal end 340 thereof for establishing a part-time (PT) position. With crowned roller 332 in this (PT) position, lever arm 308 is pivoted toward transfer clutch 50 to its maximum extent so as to exert the maximum clutch engagement force on thrust mechanism 302 for frictionally compressing the interleaved clutch plates such that transfer clutch 50 is considered to be operating in a fully-actuated (i.e., locket-up) condition. In contrast, when mode sector 324 is rotated about axis 326 for locating it in its OPEN sector position shown, the contour of mode slot 330 has caused axial displacement of crowned roller 332 from the part-time (PT) position into a full-time (FT) position. In this (FT) position, crowned roller 332 is located within mode slot 330 in close proximity to terminal end 342 thereof. Moreover, such movement of crowned roller 332 causes concurrent pivotal movement of lever arm 308 in a direction away from transfer clutch 50 which permits return spring 320 to axially shift thrust mechanism 302 so as to cause a proportional decrease in the clutch engagement force exerted on the interleaved clutch plates by thrust mechanism 302. Thus, once crowned roller 332 is in its (FT) position, lever arm 308 does not exert a clutch engagement force on thrust mechanism 302 and transfer clutch 50 is considered to be non-actuated, thereby permitting unrestricted speed differentiation across center differential 22.

Transfer case 20 is operable for establishing at least five distinct operative modes, namely, a part-time four-wheel high-range drive mode, a full-time four-wheel high-range drive mode, a Neutral mode, a full-time four-wheel low-range drive mode and a part-time four-wheel low-range drive mode. The particular operational mode selected is established by the position of crowned roller 332 in mode slot 330 and the position of roller pins 202 and 206 in guide slots 200 and 204. In operation, the vehicle operator selects a desired operative mode via mode select mechanism 62 which, in turn, signals controller 58 of the selection. Thereafter, controller 58 generates an electric control signal that is applied to range actuator 52 for controlling the rotated position of range sector 194. Likewise, controller 58 generates an electrical control signal that is applied to mode actuator 54 for controlling the rotated position of mode sector 324. Mode select mechanism 62 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality positions corresponding to the available operational modes which, in conjunction with a suitable electrical switch arrangement, generates a mode signal indicating the mode selected. In either form, mode select mechanism 62 offers the vehicle operator the option of deliberately choosing between the various operative drive modes.

When mode select mechanism 62 signals that the vehicle operator has selected either of the part-time four-wheel high-range or low-range drive modes, controller 58 sends a control signal to mode actuator 54 for generating sufficient output torque to rotate mode sector 324 to its LOCKED sector position. To provide means for holding mode sector 324 in its LOCKED sector position, power transfer system 10 includes a brake 344, schematically shown in FIGS. 2 and 7. Brake 344 is an electrically-controlled spring-applied device that is operable in a "power-off" condition for braking inertial loads (i.e., rotation) of output member 322 of mode actuator 54 and, in turn, mode sector 324. During controlled rotation of mode sector 324, an electrical signal from controller 58 maintains brake 344 in its "power-on" condition. However, once mode sector 324 has been rotated to its LOCKED position, power to brake 344 is interrupted to shift it into its power-off condition, thereby locking output member 322 against rotation. Depending on whether the part-time high-range or low-range drive mode is selected, range actuator 52 is sent an appropriate control signal from controller 58 for rotating range sector 194 to the corresponding one of its Hi-Range or Lo-Range sector positions.

According to the present invention, when transfer case 20 is operating in either of the full-time four-wheel high-range or low-range drive modes, range sector 194 is rotated to the corresponding one of its Hi-Range and Lo-Range sector positions and mode sector 324 is initially rotated to its OPEN sector position. Thereafter electronically-controlled slip limiting/torque-biasing arrangement 48 is activated for "on-demand" control of transfer clutch 50. Specifically, the actuated state of mode actuator 54 is continuously monitored and varied in accordance with specific predefined relationships established based on the current value of the sensor input signals. Thus, in the full-time four-wheel drive modes, power transfer system 10 acts as an on-demand system for continuously monitoring and automatically regulating the actuated condition of transfer clutch 50 in a manner that is independent of any deliberate action by the vehicle operator. The magnitude of clutch actuation is defined between the limits of bi-directional rotation of mode sector 324 between its LOCKED (i.e., fully-actuated) and OPEN (i.e., non-actuated) sector positions. Moreover, the magnitude of the clutch engagement force generated by lever arm 308 and applied to transfer clutch 50 is proportional to the magnitude of the output torque generated by mode actuator 54 which, in turn, is proportional to the magnitude of the electrical control signal (i.e., percentage duty cycle) applied thereto. Thus, the amount of drive torque transferred across transfer clutch 50 is also proportional to the magnitude of the control signal.

Power transfer system 10 is also operable to permit transfer case 20 to be shifted out of the part-time and full-time four-wheel drive modes and into the "Neutral" mode. Specifically, upon mode select mechanism 62 signalling selection of the Neutral mode, mode actuator 54 is actuated for locating mode sector 324 in its OPEN sector position and range sector 194 is rotated by range actuator 52 to its Neutral sector position.

Figure 7:
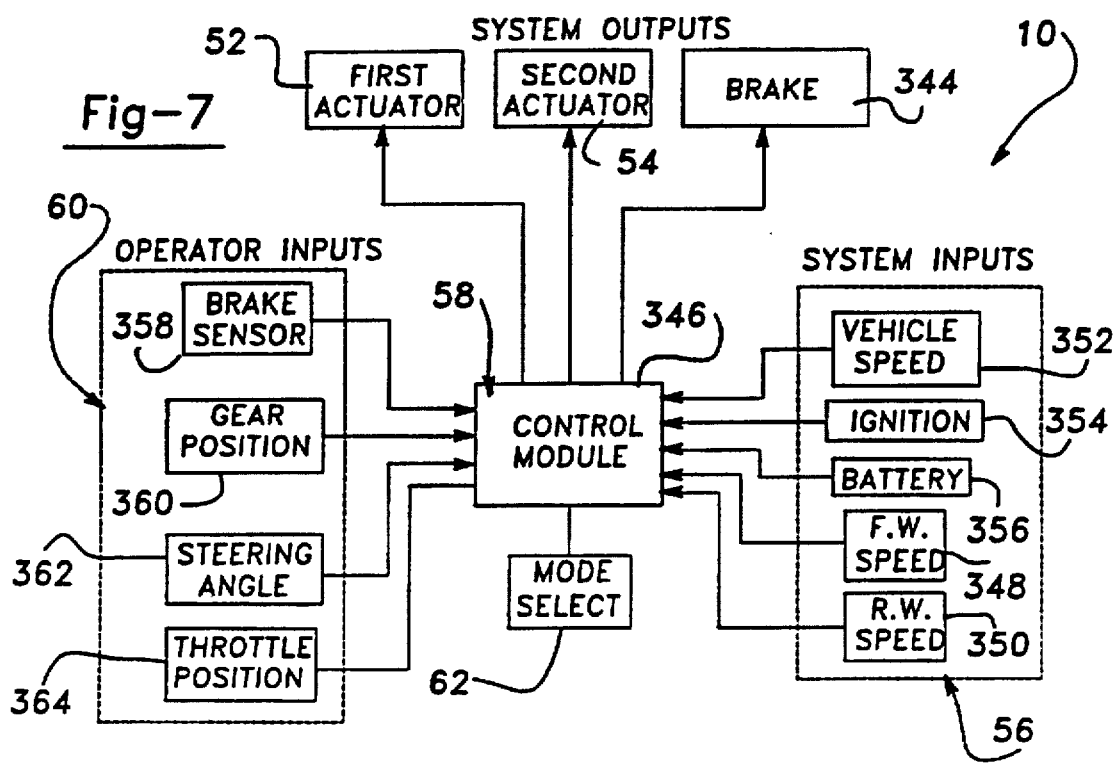
FIG. 7 is a block diagram of a control system for the power transfer system of the present invention.

With particular reference now to FIG. 7, a block diagram of a control system associated with power transfer system 10 is shown. Preferably, controller 58 is an electronic control module 346 having signal processing and information storage capabilities. In addition, first sensor group 56 is shown as a group of various "system" sensors that are provided for detecting and signaling specific dynamic and operational characteristics of the motor vehicle. The input signals generated by the "systems" sensors are delivered to electronic control module 346. Preferably, these sensors include a front speed sensor 348 for sensing the rotational speed ($n_F$) of front drive shaft 30, a rear speed sensor 350 for sensing the rotational speed ($n_R$) of rear drive shaft 40, a vehicle speed sensor 352 for sensing a vehicle speed (V), an ignition switch 354 for signalling the operational status of the vehicle, and a battery input 356 for powering electronic control module 346. In vehicles equipped with an anti-lock brake system (ABS), the original equipment ABS sensors provided at each wheel can be used for determining an "average" front drive shaft speed and rear drive shaft speed. Alternatively, front and rear speed sensors 348 and 350, respectively, can be arranged for directly measuring the speed of front output shaft 32 and rear output shaft 42, respectively. Moreover, it is possible for vehicle speed sensor 352 to be eliminated with the vehicle speed signal (V) being computed from the lower valued one of rotational speed signals ($n_F$) and ($n_R$). However, it is to be understood that any suitable speed sensing arrangement capable of generating a signal indicative of the rotational speed of a shaft is fairly within the scope of the present invention.

The control system also utilizes various "operator-initiated" inputs, as generally categorized by second sensor group 60. These inputs include a brake sensor 358 for sensing when the vehicle operator is applying the brakes, a gear position sensor 360 for sensing a gear position of transmission 18, a steering angle sensor 362 for detecting the magnitude of a steering angle ($\phi$), and an accelerator sensor 364 for sensing an accelerating condition of the vehicle. Preferably, the accelerator sensor 364 is a throttle position sensor for sensing the degree of opening of a throttle valve associated with engine 16 or for sensing the degree of depression of an accelerator pedal and to produce a throttle position signal (A). The operator-initiated input signals are delivered to control module 346 where they are used, in conjunction with the system input signals.

Figure 10:
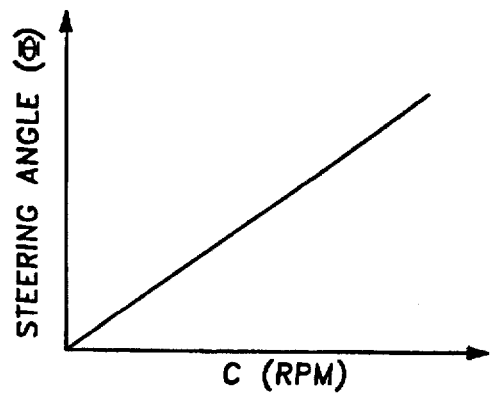
FIG. 10 is an exemplary plot of a relationship between steering angle and a control characteristic used for modifying the speed differential signal.
Figure 8:
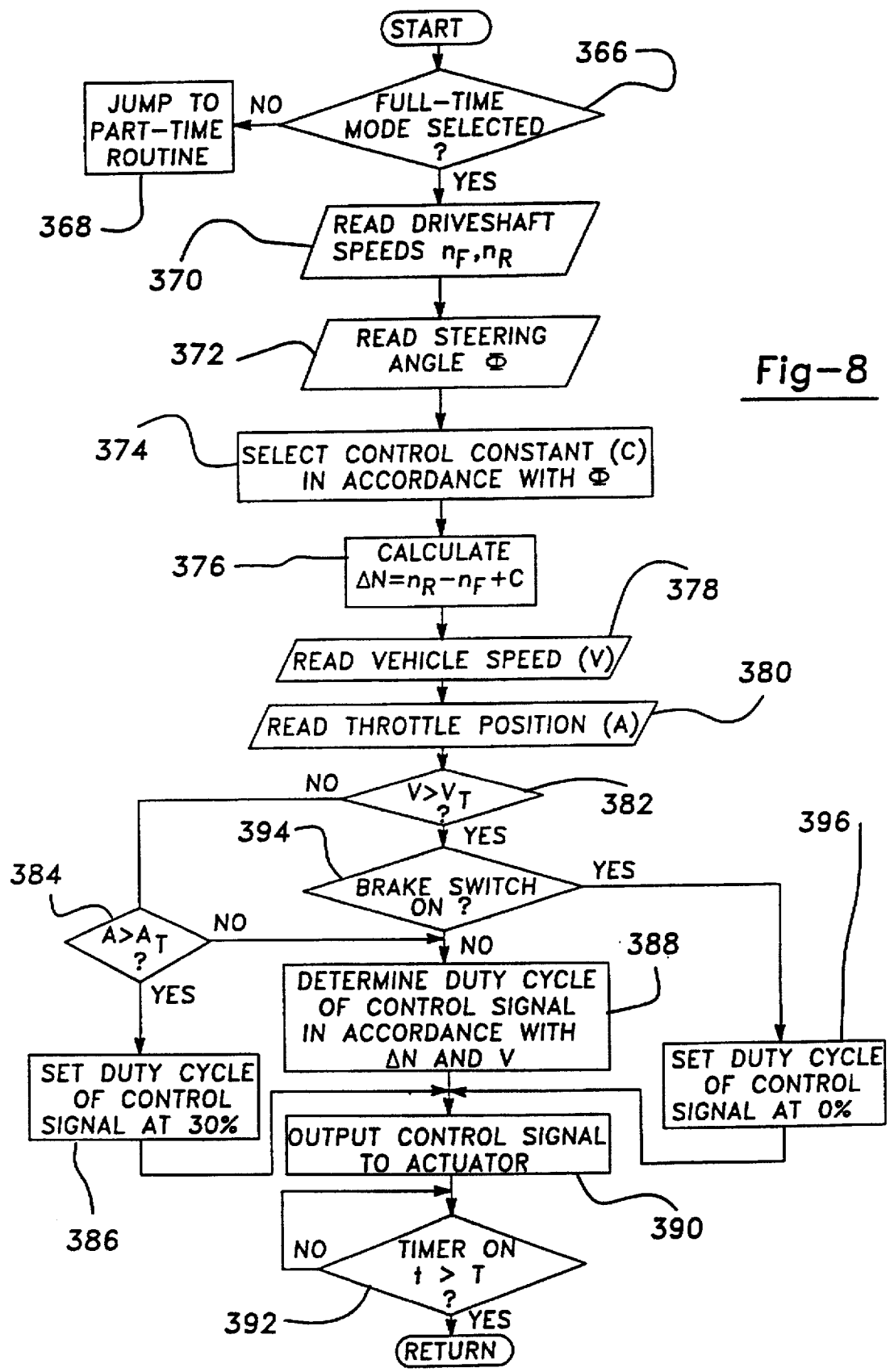
FIG. 8 is a flow chart depicting a control sequence for the operations performed by the control system of FIG. 7.

With reference now to FIG. 8, a control sequence for the selection and the subsequent automatic control of the "on-demand" full-time four-wheel drive modes is shown in a flow chart. In general, the flow chart represents a sequence of operations performed by electronic control module 346 which are diagrammatically shown in block form. When mode select mechanism 62 signals selection of an available full-time four-wheel drive mode, as indicated by block 366, a succession of control steps are repeated for determining the value of the control signal to be applied to mode actuator 54. In the preferred form, the control signal is selected in accordance with various predefined relationships between the current value of a front and rear driveline speed differential ($\Delta N$) and vehicle speed (V), as modified by current value of the steering angle ($\phi$) and other operator-initiated inputs. However, if any other mode is selected, then the control sequence jumps to a pad-time routine, as indicated by block 368. Block 370 is representative of the control step in which the current value of the rotational speed of front drive shaft ($n_F$) and rear drive shaft ($n_R$) are read. Block 372 indicates the step of reading the value of steering angle ($\phi$) as detected by steering angle sensor 362. Block 374 represents the step of selecting a control characteristic (C) in accordance with the steering angle ($\phi$). FIG. 10 illustrates a plot of an exemplary relationship, that may be stored as a look-up table or computed from an arithmetic equation, which correlates the control characteristic (C) as a function of the detected steering angle ($\phi$). Next, block 376 represents the step of calculating the value of the speed differential ($\Delta N$) according to the equation $$\Delta N = n_R - n_F + C$$

Blocks 378 and 380 indicate the steps of reading the current value of the vehicle speed (V) as detected by vehicle speed sensor 352 and the throttle position (A) as detected by throttle position sensor 364. As shown in block 382, control mode determines whether the vehicle speed (V) exceeds a predefined threshold value ($V_T$) such as, for example, 5 mph. If the vehicle speed is less than the threshold value ($V_T$), a second determination is made (block) 384 as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electric control signal is set as a preset value, such as 30% duty cycle, as indicated by block 386. In this manner, power transfer system 10 is adapted to transfer increased drive torque to front wheels 24 in response to quick acceleration at low vehicle speeds to inhibit anticipated wheel slip. However, if the value of the throttle position (A) is less than its threshold value ($A_T$), then the magnitude of the duty cycle for the control signal is set in accordance with predefined relationships between the speed differential ($\Delta N$) and vehicle speed (V), as indicated by block 388. Block 390 represents the step of outputting the electric control signal to mode actuator 54 for developing the desired amount of torque transfer, if any, across transfer clutch 50. As shown in block 392, a timer circuit actuated simultaneously with energization of mode actuator 54 for maintaining such energization for a predetermined time period (T). Once the period of energization (t) equals the predetermined time period (T), control module 346 repeats the control routine.

To enhance steering control, block 394 is indicative of the control step between steps 382 and 388 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 358) during an occurrence of a low traction road condition and the vehicle speed (V) is greater than the predefined threshold ($V_T$), then control module 346 sets the magnitude of the control signal sent to mode actuator 54 to zero (block 396) for de-actuating transfer clutch 50. This control sequence prevents simultaneous braking and torque-modulated four-wheel drive operation for providing the vehicle operator with greater steering and braking control. However, during the occurrence of a low traction condition when brake sensor 358 signals control module 346 that the vehicle operator is not applying the brakes, electronic control module 346 automatically energizes mode actuator 54 (block 390) for actuating transfer clutch 50 in accordance with the relationships generally denoted by block 388.

Figure 9:
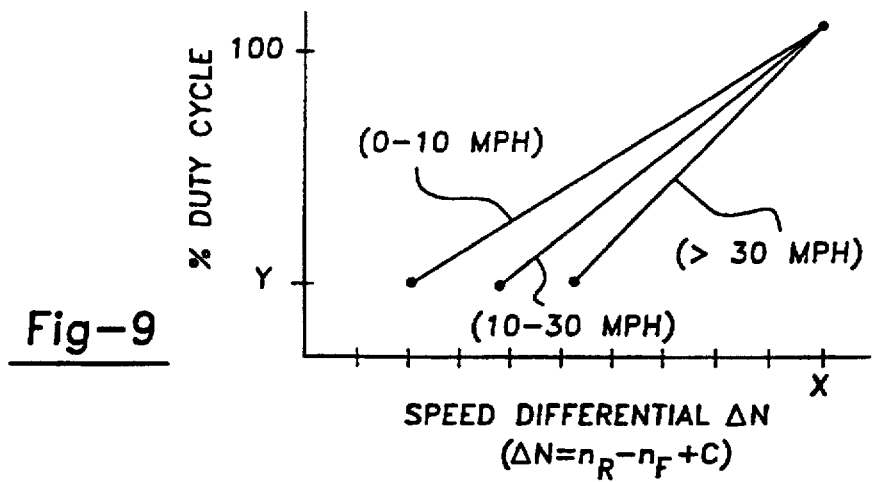
FIG. 9 illustrates plots of relationships between wheel speed differential signals at various vehicle speed ranges and the electrical control signal supplied by the control system to the actuator for controlling the amount of torque transferred through the clutch assembly.

With particular reference to FIG. 9, a set of plots used for establishing the magnitude of the duty cycle in response to the current value of the speed differential ($\Delta N$) and the vehicle speed (V) during full-time operation, as diagrammatically referred to by block 388 in FIG. 8, will now be detailed. As seen, electronic control module 346 is programmed to correlate the percentage duty cycle of the electric control signal to a range of speed differential ($\Delta N$) values. In general, the percentage duty cycle for the control signal increases from a minimum actuation value (Y %) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no drive torque is transferred through transfer clutch 50. However, when the value of the speed differential ($\Delta N$) exceeds the minimum differential limit, a control signal is supplied to mode actuator 54 having a duty cycle value greater than (Y %). Thus, the minimum actuation duty cycle (Y %) for the control signal correlates to the point at which sufficient frictional engagement between the interleaved clutch plates results in the delivery of a portion of the total drive torque to slower turning output shaft of transfer case 20 for initiating "on-demand" limited slip control during a full-time four-wheel drive operation.

Preferably, the portion of the total drive torque transferred on-demand through transfer clutch 50 to the slower-turning output shaft increases as the magnitude of the duty cycle for the control signal increases from the minimum actuation value (Y %) to the maximum actuation value (100%). Preferably, the maximum value (X) of the speed differential ($\Delta N$) correlates to the maximum actuation duty cycle (100%) at which point the maximum clutch engagement force is generated for completely locking-up transfer clutch 50. Part-time routine 368 is operable when the vehicle operator selects an operational mode via mode select mechanism 62 other than one of the full-time four-wheel drive modes, wherein control module 346 is adapted to supply control signals to range actuator 52 and mode actuator 54 for causing range sector 194 and mode sector 318 to rotate to their particular sector positions corresponding to the selected drive mode.

Due to the use of synchronized range shift arrangement 44, transfer case 20 can be shifted "on-the-fly" into any available drive mode without the requirement that the motor vehicle be in a non-motive condition. Preferably, the synchronizing capacity of synchronizer clutch apparatus 116 is selected to prevent high-range to low-range shifts when the vehicle speed exceeds a predetermined speed, most preferably in the range of about 30 to 50 miles per hour. Alternatively, synchronizer clutch apparatus 116 can be equipped with a shift inhibitor mechanism for preventing such high to low range shifts above a predetermined vehicle speed. Commonly-owned U.S. Pat. No. 4,901,835 to Frost discloses one type of suitable centrifugally-activated shift inhibitor. Such shift prevention can likewise be controlled electronically in association with the control system of the present invention. As will also be appreciated, any suitable type of synchronizer device (i.e., single-cone, dual-cone, multi-cone, strut-type, strutless, etc.) can be used with synchronized range shift arrangement 44.

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a four-wheel drive motor vehicle having a power source and front and rear drivelines, comprising:

a transfer case including a housing; an input shaft rotatably supported in said housing and driven by the power source; a front output shaft rotatably supported in said housing and coupled to the front driveline; a rear output shaft rotatably supported in said housing and coupled to the rear driveline; a mainshaft; a dual-planetary gear reduction unit operable for selectively coupling said input shaft to said mainshaft to define a high-range drive mode in which said mainshaft is driven at a direct speed ratio relative to said input shaft and a low-range drive mode in which said mainshaft is driven at a reduced speed ratio relative to said input shaft, said dual-planetary gear reduction unit having a first sun gear driven by said input shaft, a second sun gear, and a carrier assembly driving said mainshaft and having planet gears journally supported thereon intermeshed with said first and second sun gears; a range actuator, a first clutch that can be selectively actuated by said range actuator for coupling said input shaft to said carrier assembly to establish said high-range drive mode; a second clutch that can be selectively actuated by said range actuator for coupling said second sun gear to said housing to establish said low-range drive mode; and an interaxle differential interconnecting said mainshaft to said front and rear output shafts for permitting speed differentiation therebetween to define a full-time four-wheel high-range drive mode and low range drive mode, said interaxle differential including an input driven by said mainshaft, a first output interconnecting said input to said front output shaft, and a second output interconnecting said input to said rear output shaft; and a mode select mechanism operably connected to said range actuator for enabling a vehicle operator to select one of said full-time four-wheel high-range drive mode and said full-time four-wheel low-range drive mode.

2. The power transfer system of claim 1 wherein said transfer case includes a torque biasing device for controlling the torque delivered to said first and second outputs of said interaxle differential as a function of the speed differential therebetween.

3. The power transfer system of claim 2 wherein said torque biasing device is a transfer clutch operable for controlling speed differentiation across said interaxle differential, said transfer clutch includes a set of first clutch plates supported for rotation with said first output of said interaxle differential, a set of second clutch plates supported for rotation with said second output of said interaxle differential and which are alternately interleaved with said first clutch plates, a thrust mechanism movable between a first mode position whereat a minimum clutch engagement force is exerted on said clutch plates for permitting unrestricted speed differentiation between said front and rear output shafts and a second mode position whereat a maximum clutch engagement force is exerted on said clutch plates for inhibiting speed differentiation between said front and rear output shafts, and a mode actuator for selectively moving said thrust mechanism between its first and second mode positions, and wherein said power transfer system further includes:

sensors for detecting dynamic and operational characteristics of the motor vehicle and for generating sensor input signals indicative thereof; and a controller for controlling actuation of said first and second clutches and said mode actuator in response to said sensor input signals and a mode signal generated by said mode select mechanism, said controller is operable to actuate said first clutch and to vary the position of said thrust mechanism between its first and second mode positions in response to changes in said sensor input signals when said mode signal indicates selection of said full-time four-wheel high-range drive mode.

4. The power transfer system of claim 3 wherein said controller is operable to actuate said second clutch and to vary the position of said thrust mechanism between its first and second mode positions in response to changes in said sensor input signals when said mode signal indicates selection of said full-time four-wheel low-range drive mode.

5. The power transfer system of claim 3 wherein said mode select mechanism enables selection of a locked four-wheel low-range drive mode and generates a mode signal indicative thereof, and wherein said controller is operable to actuate said second clutch and causes said mode actuator to move said thrust mechanism to its second mode position when said mode signal indicates selection of said locked four-wheel low-range drive mode.

6. The power transfer system of claim 3 wherein said mode select mechanism is further operable for enabling the vehicle operator to select a locked four-wheel high-range drive mode and generate a mode signal indicative thereof, said controller is operable to actuate said first clutch and cause said mode actuator to move said thrust mechanism to its second mode position when said locked four-wheel high-range is selected.

7. The power transfer system of claim 1 wherein said first clutch includes a first range sleeve rotatably driven by said input shaft and which is movable between a neutral position uncoupled from said carrier assembly and a high-range position coupled to said carrier assembly, and a first synchronizer for causing speed synchronization between said input shaft and said carrier assembly in response to movement of said first range sleeve to its high-range position, and wherein said second clutch includes a second range sleeve rotatably driven by said second sun gear and which is movable between a neutral position uncoupled from said housing and a low-range position coupled to said housing, and a second synchronizer for causing speed synchronization between said second sun gear and said housing in response to movement of said second range sleeve to its low-range position.

8. The power transfer assembly of claim 7 wherein said transfer case further comprises a drive mechanism interconnected to said first and second range sleeves for controlling coordinated movement thereof, said first drive mechanism being movable between a first range position whereat said first range sleeve is located in its high-range position and said second range sleeve is located in its neutral position for establishing said high-range drive mode, a second range position whereat said first and second range sleeves are each located in its neutral position for establishing a neutral non-driven mode, and a third range position whereat said first range sleeve is located in its neutral position and said second range sleeve is located in its low-range position for establishing said low-range drive mode.

9. The power transfer assembly of claim 8 wherein said transfer case includes a torque biasing device for controlling speed differentiation across said interaxle differential.

10. A transfer case for use in a four-wheel drive motor vehicle having a power source and front and rear drivelines, comprising:

a housing;

an input shaft rotatably supported in said housing and driven by the power source;

a front output shaft rotatably supported in said housing and coupled to the front driveline;

a rear output shaft rotatably supported in said housing and coupled to the rear driveline;

a mainshaft;

a dual-planetary gear reduction unit operable for selectively coupling said input shaft to said mainshaft to define a high-range drive mode in which said mainshaft is driven at a direct speed ratio relative to said input shaft and a low-range drive mode in which said mainshaft is driven at a reduced speed ratio relative to said input shaft, said dual-planetary gear reduction unit having a first sun gear driven by said input shaft, a second sun gear, and a carrier assembly driving said mainshaft and having planet gears journally supported thereon intermeshed with said first and second sun gears;

a first clutch supported for rotation with said input shaft and movement between a neutral position uncoupled from said carrier assembly and a high-range position coupling said input shaft to said carrier assembly, and a first synchronizer for causing speed synchronization between said input shaft and said carrier assembly in response to movement of said first clutch from its neutral position to its high-range position;

a second clutch supported for rotation with said second sun gear of said dual-planetary gear reduction unit and movement between a neutral position uncoupled from said housing and a low-range position coupling said second sun gear to said housing, and a second synchronizer for causing speed synchronization between said second sun gear and said housing in response to movement of said second clutch from its neutral position to its low-range position;

an interaxle differential interconnecting said mainshaft to said front and rear output shafts for permitting speed differentiation therebetween, said interaxle differential including an input driven by said mainshaft, a first output interconnecting said input to said front output shaft, and a second output interconnecting said input to said rear output shaft; and a range shift mechanism operable for moving said first and second clutches between their respective positions to establish one of a four-wheel high-range drive mode, a neutral mode, and a four-wheel low-range drive mode.

11. The transfer case of claim 10 wherein said transfer case includes a torque biasing device for controlling the torque delivered to said first and second outputs of said interaxle differential as a function of the speed differential therebetween.

12. The transfer case of claim 11 wherein said torque biasing device is a transfer clutch operable for controlling speed differentiation across said interaxle differential, said transfer clutch includes a set of first clutch plates supported for rotation with said first output of said interaxle differential, a set of second clutch plates supported for rotation with said second output of said interaxle differential and which are alternately interleaved with said first clutch plates, a thrust mechanism movable between a first mode position whereat a minimum clutch engagement force is exerted on said clutch plates for permitting unrestricted speed differentiation between said front and rear output shafts and a second mode position whereat a maximum clutch engagement force is exerted on said clutch plates for inhibiting speed differentiation between said front and rear output shafts, and a mode actuator for selectively moving said thrust mechanism between its first and second power transfer system wherein said power transfer system further includes:

sensors for detecting dynamic and operational characteristics of the motor vehicle and for generating sensor input signals indicative thereof; and a controller for controlling actuation of said first and second clutches and said mode actuator in response to said sensor input signals and a mode signal generated by said mode select mechanism, said controller is operable to actuate said first clutch and to vary the position of said thrust mechanism between its first and second mode positions in response to changes in said sensor input signals when said mode signal indicates selection of said four-wheel high-range drive mode.

13. The transfer case of claim 12 wherein said controller is operable to actuate said second clutch and to vary the position of said thrust mechanism between its first and second mode positions in response to changes in said sensor input signals when said mode signal indicates selection of said four-wheel low-range drive mode.

14. The transfer case of claim 10 wherein said first clutch includes a first range sleeve rotatably driven by said input shaft and which is movable between a neutral position uncoupled from said carrier assembly and a high-range position coupled to said carrier assembly, and a first synchronizer for causing speed synchronization between said input shaft and said carrier assembly in response to movement of said first range sleeve to its high-range position, and wherein said second clutch includes a second range sleeve rotatably driven by said second sun gear and which is movable between a neutral position uncoupled from said housing and a low-range position coupled to said housing, and a second synchronizer for causing speed synchronization between said second sun gear and said housing in response to movement of said second range sleeve to its low-range position.

15. A gear reduction unit for use in a power transfer device having a first shaft and a second shaft rotatably supported in a housing, said gear reduction unit comprising:

a first sun gear driven by said first shaft;

a second sun gear;

a carrier assembly coupled to said second shaft and having planet gears journally supported thereon intermeshed with said first and second sun gears;

a first clutch supported for rotation with said first shaft and movement between a neutral position whereat said first shaft is uncoupled from said carrier assembly and a high-range position whereat said input shaft is coupled to said carrier assembly;

a second clutch supported for rotation with said second sun gear and movement between a neutral position whereat said second sun gear is uncoupled from the housing and a low-range position whereat said second sun gear is coupled to the housing; and a range shift mechanism interconnected to said first and second clutches for controlling movement thereof such that said first clutch is located in its high-range position and said second range sleeve is located in its neutral position for causing said second shaft to be driven at a direct speed ratio relative to said first shaft to define a high-range drive connection therebetween, wherein said first and second clutches are each located in its neutral position for uncoupling said second shaft from said first shaft to define a neutral non-driven mode, and wherein said first clutch is located in its neutral position and said second clutch is located in its low-range position for causing said second shaft to be driven at a reduced speed ratio relative to said first shaft to define a low-range drive connection therebetween.

* * * * *

UNITED STATES PATENT AND TRADEMARK OFFICE
CERTIFICATE OF CORRECTION

PATENT NO. : 5,720,688
DATED : February 24, 1998
INVENTOR(S) : Robert J. Wilson, David Sperduti It is certified that error appears in the above-identified patent and that said Letters Patent is hereby corrected as shown below:

Column 1, line 59, "system" should be --systems--.

Column 5, line 22, "of" should be --or--.

Column 8, line 37, "desire" should be --desired--.

Column 12, line 11, "locket-up" should be --locked-up--.

Column 14, line 43, "pad-time" should be --part-time--.

Column 14, line 67, "(block) 384" should be --(block 384)--.

Column 19, line 52/53, claim 12 "power transfer system" should be --mode positions, and--.

Signed and Sealed this

Twenty-sixth Day of January, 1999

Attest:

Attesting Officer

*Acting Commissioner of Patents and Trademarks*